US007502922B1

(12) United States Patent
Amin et al.

(10) Patent No.: US 7,502,922 B1
(45) Date of Patent: Mar. 10, 2009

(54) COMPUTER NETWORK HAVING A SECURITY LAYER INTERFACE INDEPENDENT OF THE APPLICATION TRANSPORT MECHANISM

(75) Inventors: Baber Amin, Provo, UT (US); Hashem Mohammad Ebrahimi, Salt Lake City, UT (US)

(73) Assignee: Novell, Inc., Provo, UT (US)

( * ) Notice: Subject to any disclaimer, the term of this patent is extended or adjusted under 35 U.S.C. 154(b) by 1481 days.

(21) Appl. No.: 09/620,176

(22) Filed: Jul. 20, 2000

Related U.S. Application Data

(60) Provisional application No. 60/186,149, filed on Mar. 1, 2000.

(51) Int. Cl.
*G06F 21/00* (2006.01)
(52) U.S. Cl. ...................................... 713/151
(58) Field of Classification Search ................. 713/151, 713/152, 155; 709/223
See application file for complete search history.

(56) References Cited

U.S. PATENT DOCUMENTS

| | | | | |
|---|---|---|---|---|
| 5,349,642 | A | | 9/1994 | Kingdon .................... 380/25 |
| 5,689,565 | A | * | 11/1997 | Spies et al. ................ 713/189 |
| 5,781,534 | A | | 7/1998 | Perlman et al. ............ 370/248 |
| 5,922,074 | A | * | 7/1999 | Richard et al. ............ 713/200 |
| 5,933,503 | A | | 8/1999 | Schell et al. ............... 380/25 |
| 6,029,247 | A | | 2/2000 | Ferguson ................... 713/201 |
| 6,081,900 | A | | 6/2000 | Subramaniam et al. ..... 713/201 |
| 6,304,974 | B1 | * | 10/2001 | Samar ........................ 713/201 |
| 6,490,679 | B1 | * | 12/2002 | Tumblin et al. ............. 713/155 |

OTHER PUBLICATIONS http://www.webopedia.com/TERM/P/protocol_stack.html.*
WinSock 2 Information, pp. 1-8, Dec. 5, 1998.
SSL Architectural Overview, pp. 1-2, Sep. 1996.
What's Enhanced in NetWare 5, pp. 1-2, May 1998.
Securing the Web, pp. 1-2, no later than Jan. 3, 2000.
Re: SSL and GSSAPI, pp. 1-2, Mar. 6, 1997.
SSL-Specific WSAIoctl Controls, Sep. 1996.
Secure Sockets Layer Discussion List FAQ v1.1.1, pp. 1-25, Nov. 21, 1999.

* cited by examiner

*Primary Examiner*—Andrew L Nalven
(74) *Attorney, Agent, or Firm*—Schwegman, Lundberg & Woessner, P.A.

(57) ABSTRACT

An architecture for secure network communications includes a security layer sandwiched between an upper connection layer and a lower connection layer. An application program need not deal directly with the details of security handshakes, encryption, and decryption. Instead, the application sends plain text data to the upper connection layer, which passes it to the security layer. The security layer manages the necessary security handshakes, and encrypts the data. The security layer then passes the encrypted application data to the lower connection layer, which transports it using TCP or another transport protocol. The security layer need not manage the transport protocol, as this is done by the connection layers. Encrypted data received over the network at the lower connection layer is passed to the security layer for decryption, and then to the upper connection layer for transport to the application.

20 Claims, 8 Drawing Sheets

COMPUTER NETWORK HAVING A SECURITY LAYER INTERFACE INDEPENDENT OF THE APPLICATION TRANSPORT MECHANISM

RELATED APPLICATIONS

This application claims priority to and incorporates by reference commonly owned copending U.S. Provisional Patent Application No. 60/186,149 filed Mar. 1, 2000.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The copyright owner does not hereby waive any of its rights to have this patent document maintained in secrecy, including without limitation its rights pursuant to 37 C.F.R. § 1.14.

FIELD OF THE INVENTION

This application relates generally to the security of communications in a computer network, and relates more particularly to network architecture and the manner in which application programs interface with network security modules.

TECHNICAL BACKGROUND

In the past, Novell, Inc. of Provo, Utah has made available a Secure Authentication Service (SAS) providing Application Program Interfaces (APIs) for secure access to target resources in a computer network, using the security capabilities of industry-standard Secure Sockets Layer (SSL) sessions. Novell's SAS also provides other capabilities, such as user authentication, and graded authentication in conjunction with Novell Modular Authentication Service (NMAS). Graded authentication and computer security are discussed in U.S. patent application Ser. No. 08/802,764 filed Feb. 20, 1997 for a "Computer Network Graded Authentication System and Method". SSL services in SAS use Novell Public Key Infrastructure ("PKI"), and Novell International Cryptographic Infrastructure ("NICI") to provide a secure communication channel for applications. Suitable applications include Novell Lightweight Directory Access Protocol ("NLDAP"), Novell's Authentication over SSL in both BorderManager and Internet Caching Services (ICS), Novell's SAA product, and other products from Novell or other vendors.

Applications which sought to provide secure access to resources had to make specific SAS API calls which were separate from the standard transport APIs. For example, as shown in FIG. 1, a Novell or other LDAP application 100 had calls to both a BSD socket API 102 and an SAS API 104. Likewise; to use an SSL service in SAS, a proxy authentication application 106 in BorderManager and ICS had calls to both a Novell Proxy Connection API 108 and the SAS API 104. The connection layers 102, 108 called in turn on a transport layer such as a TCP/IP layer 110. As noted, SAS also provided services for PKI 112 and CCS/NICI 114. The SAS API 104 and the connection layer 102, 108 APIs define an application boundary 116 between applications such as LDAP 100 and proxy authentication 106, on the one hand, and network services for security and transport, and the other hand.

The nature of the application boundary 116 thus defined imposed significant burdens on applications that sought to provide secure access to network resources. Using SAS, an application had to be explicitly aware and involved in all aspects of security procedures, such as SSL handshakes, payload encryption, and payload decryption. Thus, at least a portion of the application had to be written twice for a particular service; once in the regular non-secure fashion and once again to provide that same service securely.

Accordingly, it would be an advance in the art to provide better ways to make SSL or other secure network communication channels available to applications. In particular, it would be an advance to relieve applications of direct responsibility for managing security procedures such as handshakes and encryption/decryption, while still making industry-standard tools such as SSL available for use by the applications.

Such improvements are disclosed and claimed herein.

BRIEF SUMMARY OF THE INVENTION

The present invention provides tools and techniques that permit transport-independent secure communications in a computer network. One embodiment of a method according to the invention includes receiving application data, from an application such as LDAP, at an upper connection layer of a transport provider. The application data, which may be encrypted but need not be, is passed from the upper connection layer to a security layer. The security layer encrypts the application data according to SSL, TLS, or another security protocol, and then passes the encrypted application data to a lower connection layer which sends the encrypted application data out a network connection according to TCP, WinSock, or another transport protocol. The connection layers may support one or more network transport protocols. Advantageously, the application is not required to perform security handshakes in order to send encrypted application data over the network, and the security layer is not specific to a given transport protocol.

The method may further include receiving at the lower connection layer encrypted application data which came in at the network connection; passing the encrypted application data from the lower connection layer to the security layer; decrypting the application data within the security layer; passing the decrypted application data from the security layer to the upper connection layer; and sending the decrypted application data from the upper connection layer to the application, without requiring that the application perform a security handshake. The lower connection layer may establish a connection with a handshake mode that is at least one of an interactive mode and a blind-root-accept mode, and/or at least one of a server mode, a client mode, and a server with client authentication enabled mode. A list of trusted roots for the secure connection may be modified, and the security layer may use a function or other means to inform a connection layer of security handshake proceedings.

One embodiment of a system for secure computer networking comprises an application which is free of code for performing security procedure handshakes for secure network communications; at least one connection layer which interfaces with the application, the connection layer comprising an upper connection layer and a lower connection layer, the connection layers comprising code for performing at least one network transport protocol; and a security layer callable from the connection layer rather than the application, the security layer comprising code for performing security procedure handshakes for secure network communications, the security layer also comprising code for encrypting and decrypting application data.

The connection layers include code for performing a WinSock network transport protocol or another transport protocol. The security layer includes code for performing security procedure handshakes for a Secure Sockets Layer, Transport Layer Security, or other secure session. The application includes code for providing Lightweight Directory Access Protocol services, caching services, proxy services, or other network services. Support may also be provided for a legacy application which performs security handshakes, by a SAS or SASF security module supporting a secure connection to the legacy application.

A configured storage medium according to the invention may embody data and instructions readable by a computer to perform a method of processing application data for secure network communications. For instance, one method includes the computer-implemented steps of receiving a request at a security layer from a lower connection layer to establish a secure connection; in response to the request, utilizing a means for establishing a connection to establish the requested connection; and at the security layer, receiving encrypted application data from the lower connection layer over the connection, decrypting the application data, and passing the decrypted application data to an upper connection layer. Thus, an application receives the decrypted application data without being required to perform security procedure handshakes for secure network communications. The means for establishing a connection may establish a Secure Sockets Layer connection, or a TLS connection, for instance. The method may further include receiving the encrypted application data at the lower connection layer using a transport model, such as WinSock or a Novell proxy transport model. The configured storage medium may be combined with a signal embodied in the computer, such as a signal comprising a secure network communications protocol stack interface which is callable from at least the lower connection layer.

Other features and advantages of the invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to methods, articles, signals, and systems for adding Secure Sockets Layer ("SSL") or Transport Layer Security ("TLS") functionality to a computer network without requiring that direct SSL/TLS calls be performed by an application program. The invention provides a transport independent mechanism for providing secure connections among and between peers in heterogeneous networks. In particular, the invention provides both client and server applications with a virtual "hands free" environment for establishing and maintaining secure Internet connections using SSL, TLS, or other security layer, without regard to network configuration or low level protocol considerations.

Figure 1:
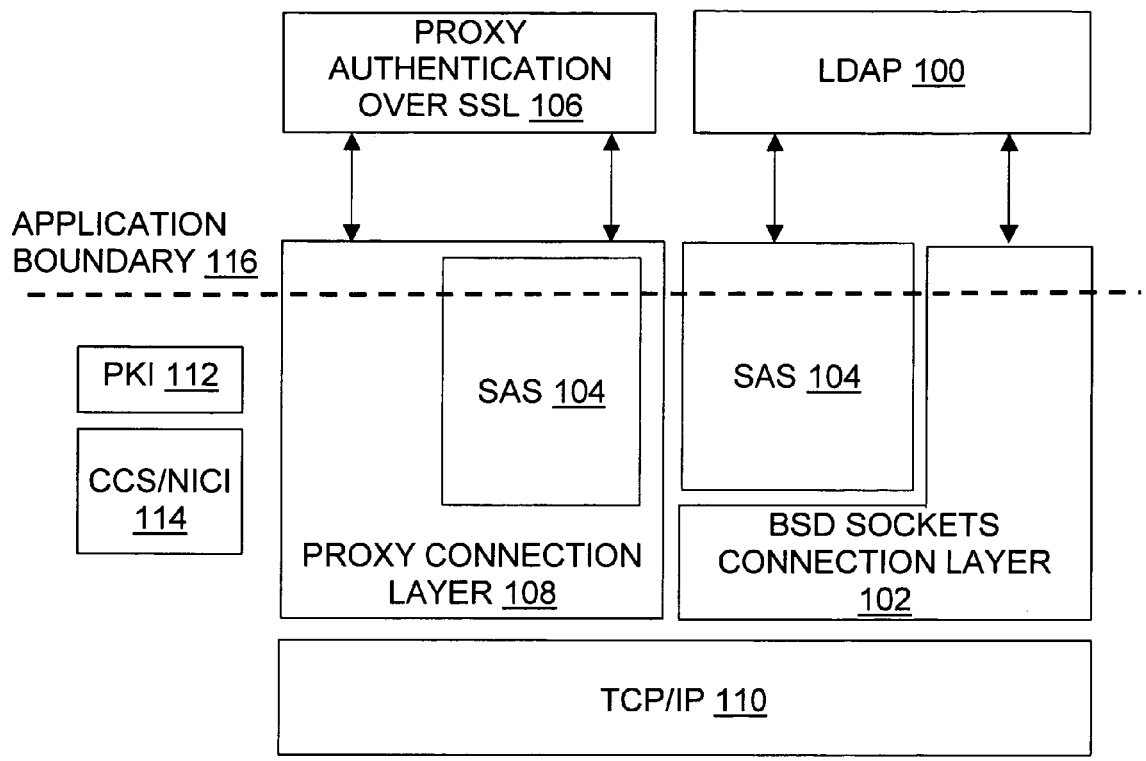
FIG. 1 is a diagram illustrating applications, transport APIs, and security APIs in a conventional system architecture.
Figure 2:
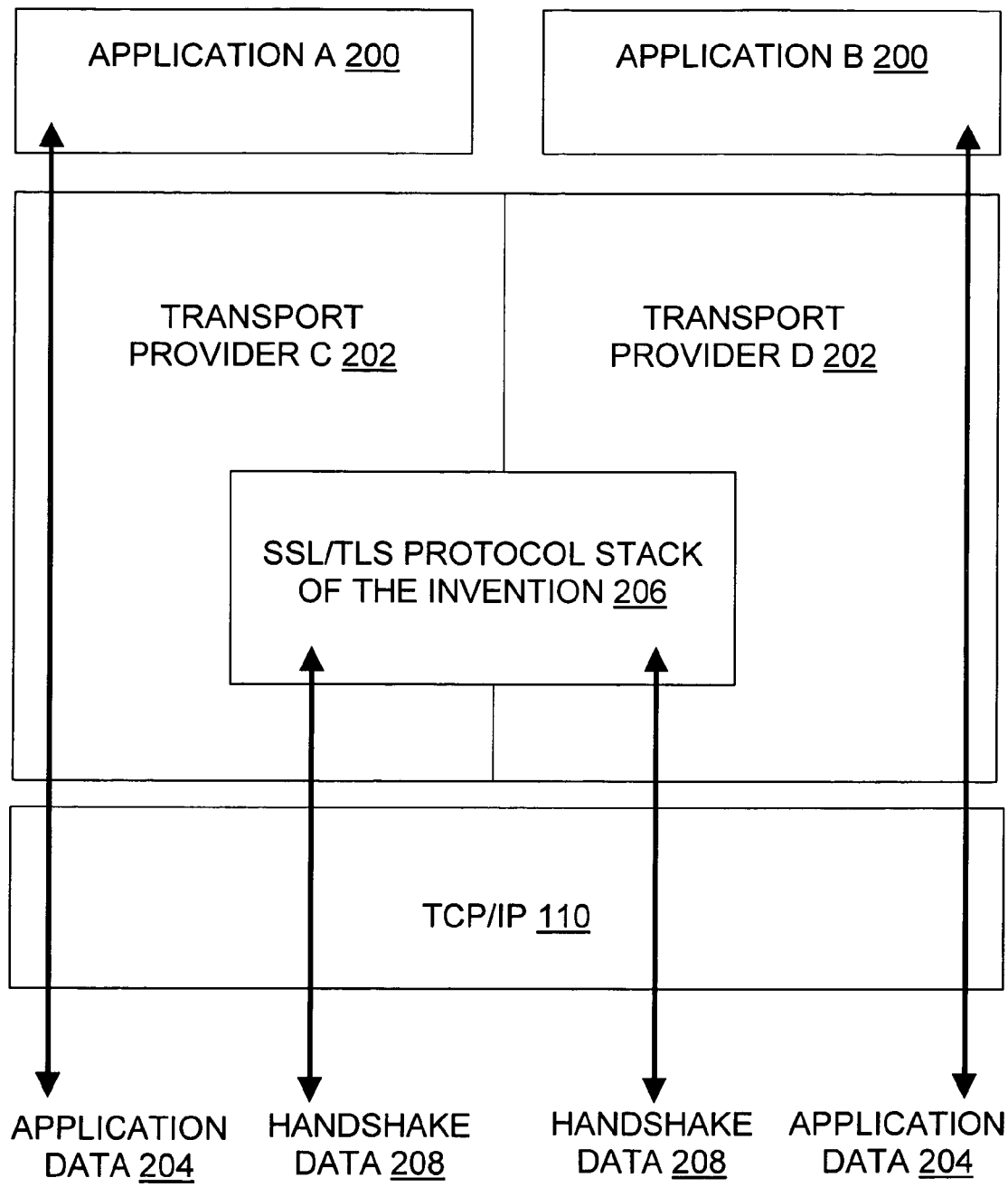
FIG. 2 is a diagram illustrating an architecture according to the present invention, including transport providers adapted to use a protocol stack of the invention.

FIGS. 2 through 5 each provide a functional overview of the invention. As shown in FIG. 2, for instance, applications 200 provide transport layers 202 with application data 204 to be securely transported, and similarly receive securely transported data 204 from the transport layers 202. A novel SSL, TLS, or other security protocol stack 206 is used by the transport provider 202, and uses the transport provider 202, to send and receive handshake data 208. The transport providers 202 use conventional TCP/IP 110 or other modules to send and receive the application data 204 and the handshake data 208.

Figure 3:
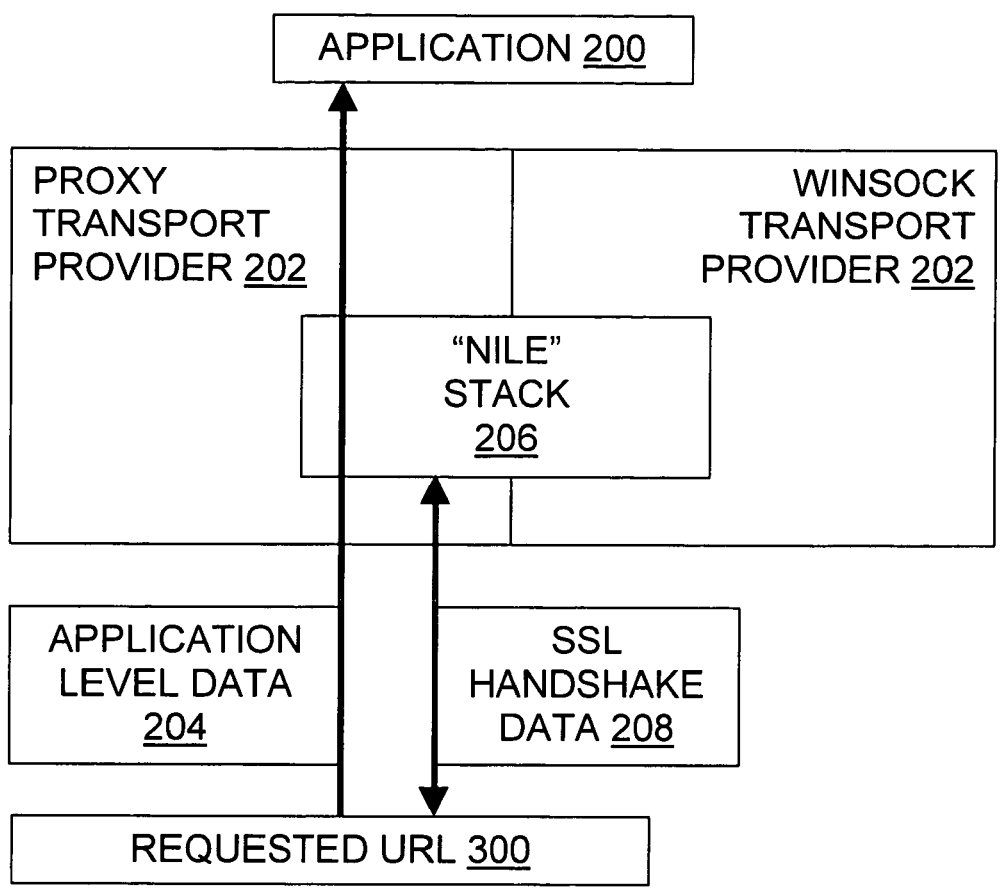
FIG. 3 is a diagram illustrating another architecture according to the present invention, including one or more particular transport providers adapted to use a protocol stack of the invention, for providing secure communications between an application and a web site.

Thus, the lower level secure transactions such as SSL or TLS handshake, decryption, and encryption have been offloaded from the applications 200 by the inventive architecture shown in FIG. 2. A given application 200 is unaware of and free from interaction with any detailed aspect of the infrastructure for secure transport. The applications 200 will receive and send their data 204 in clear form (i.e., not encrypted) and the applications 200 do not have to worry about SSL/TLS related functions such as SSL/TLS handshake, encryption, and decryption. This allows application 200 developers to focus on their respective application-specific problems and protocols, without worrying about a secure transport. For example, as shown in FIG. 3, an application 200 containing an implementation of the HyperText Transfer Protocol (HTTP) can automatically be made "aware" of HTTPS (i.e., HTTP with SSL) so that HTTPS is used to obtain information from web sites 300 without detailed security oversight by the application 200. The term "NILE" is a name which has been used internally by Novell to refer to aspects and/or embodiments of the invention. Suitable applications 200 include proxy servers, LDAP servers, caching servers, portals, and other network applications.

Figure 4:
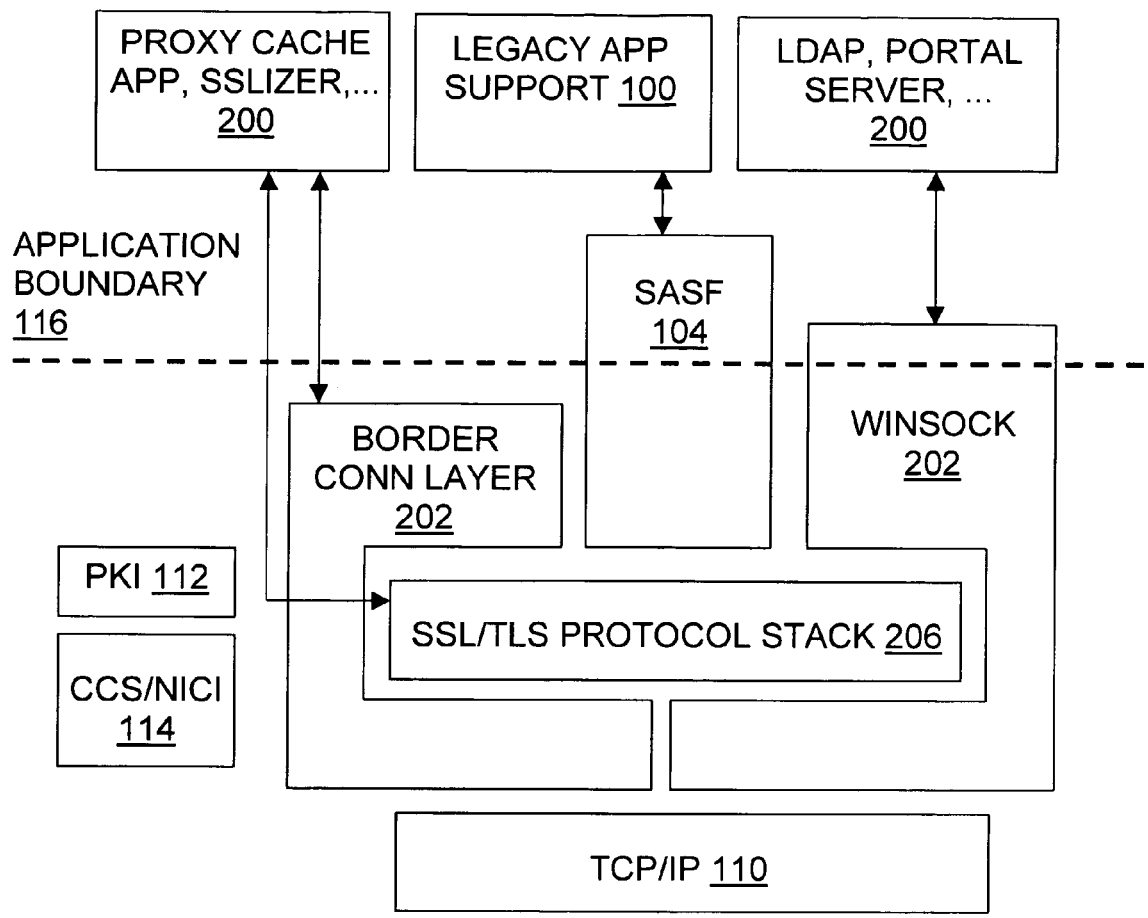
FIG. 4 is a diagram illustrating another architecture according to the present invention, including one or more particular transport providers adapted to use a protocol stack of the invention for secure communications with one or more applications which have been freed by the invention from direct management of security procedures, as well as architectural components supporting legacy applications and their conventional interfaces for managing secure communication procedures.

As shown in FIG. 4 by the connection between an "SSL-izer" application 200 and the security stack 206, the present invention does not require removal of direct low-level interfaces between the security stack 206 and an application 200, but rather permits their removal or avoidance. The "SSL-izer" technology (a.k.a. "SSLizer" or "SSLIZER" technology) is discussed in U.S. patent application Ser. No. 09/268,795 filed Mar. 6, 1999 for "Secure Intranet Access". As indicated by FIG. 4, a system according to the invention may also include conventional "legacy" applications 100 and support for their direct management of security handshakes, encryption, and so forth.

From the transport 202 developer point of view, an embodiment of the invention provides two Application Program Interface calls or other entry points into the invention:

API_1 for registration, and

API_2 for de-registration.

Examples are discussed below in connection with source code. This approach provides a virtually impact-free migration path for all network services to acquire SSL/TLS functionality. The invention will work with any transport stack 202; examples include WinSock, Novell's connection layer for Proxy, and others.

Although specific function names, variable names, data types, parameter lists, and the like are identified here in connection with source code, those of skill will understand that the invention can be implemented using other alternatives. Indeed, to further emphasize this flexibility, the function names in the Figures and those in the text are not entirely identical.

As shown in the Figures, the invention provides a network architecture design wherein SSL and/or TLS are available as a security service provider on top of TCP code 110. The invention likewise provides a network architecture design wherein a security plug-in module is available for use by N number of transport providers on top of a reliable delivery protocol, such as TCP. This secure pipe can be made responsible for all secure data transfer between two end points. Applications 200 can use the invention for pure SSL/TLS sessions, and/or with other capabilities, such as in combination with NMAS to provide graded user authentication, and/or policy and resource usage enforcement.

In some embodiments, a Public Key Infrastructure ("PKI") 112 and/or a Novell International Cryptographic Infrastructure ("NICI",) 114 are present. In these and other embodiments, implementations of the invention will provide a fast, pure SSL/TLS service to any transport service provider, for use by applications such as Lightweight Directory Access Protocol ("LDAP") applications using the WinSock APIs or SSLizer, and authentication over SSL services using Novell's proxy connection APIs.

Figure 5:
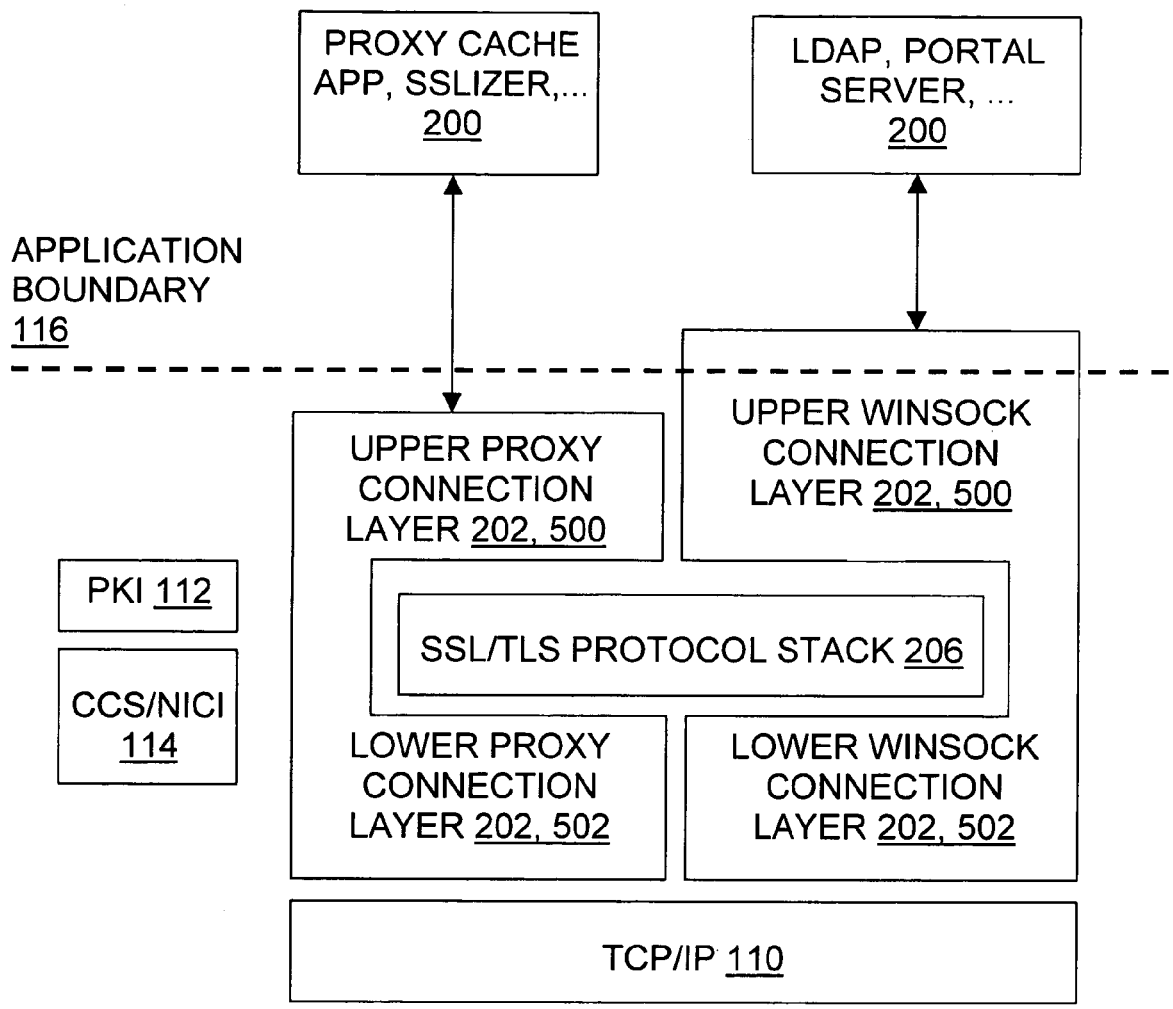
FIG. 5 is a diagram further illustrating architectures according to the present invention, in which each of one or more transport provider connection layers comprises an upper layer and a lower layer.

For convenience and clarity, WinSock 202 and/or the Novell proxy connection layer 202 are each divided into an upper layer 500 and a lower layer 502, as first shown expressly in FIG. 5. Conceptually, the upper layer 500 and the lower layer 502 of a given transport provider 202 are connected internally and form a "U" shape around the inventive security protocol stack 206. By dividing layers this way, it is easier to see the flow of data according to the inventive architecture; this division is logical rather than physical.

One embodiment is a pure protocol implementation. In such an embodiment, all legacy SAS APIs 104 that need to be supported could be moved to NMAS, which is the new embodiment of the Secure Authentication Services Framework (SASF). Without the invention, applications wishing to use SAS must explicitly make that decision and call a separate set of APIs to do so. There is considerable overhead associated with this approach, not to mention that it also makes SAS inflexible for use with any connection model other than sockets. Embodiments of the invention can remove all notions of secure connection establishment from the application's perspective, and free SSL from some constraints that were placed on SSL because it resides in user space.

In removing all but the protocol functionality while adapting the existing architecture to use the invention, NMAS may provide legacy support and all supporting framework functionality to applications 100 that use the old interface, as illustrated for instance in FIG. 4. The embodiment can still interact with NICI 114 and Novell's PKI 112 in the same manner as the architecture did prior to adaptation, for cryptographic and public key services respectively. It can also interact with other cryptographic service provider and PKI systems.

By providing a modular pluggable, extensible interface and/or Service Provider Interface ("SPI") under transport models for Winsock, Novell's proxy connection layer, and any other connection layer 202 protocol, one exploits the true nature of SSL/TLS, which is being a layered protocol. Not only does that give application 200 writers the same interface under every operating system that supports their respective connection layer, it is forward compatible with an approach in which Novell's proxy connection layer and Winsock protocols are merged to provide a unified transport interface to applications.

Without the invention, it is necessary to implement N distinct sets of SSL/TLS aware interfaces for N separate connection models. For instance, one may need to support two distinct sets of applications 100 using separate connection models, namely, Novell proxy connection layer 108 and WinSock. The invention provides a single SSL/TLS stack 206 for multiple connection interfaces. Toward this end, one abstracts the transport functionality out and separates it from the security functionality. A security interface is exported to various transport connection layers 202, but there need be no application API support for the security stack 206, that is, no security API directly used by applications 200.

Data flow for handshake and for subsequent data transfer, irrespective of a connection manager, is described below and shown in FIGS. 6 through 8. For the purposes of this discussion, the generic term "connection manager" will refer to both the WinSock model and the Novell proxy connection model, as embodied in transport providers 202. In one embodiment, memory buffers being passed back and forth are of type BufSegmnent, shown in the listing below. This in turn abstracts all memory management and provides a transparent way to pass data back and forth between the connection layer 202 and SSL/TSL/other secure communications stack 206.

Initialization and Handshake

The connection layer 202 registers with a module 206 according to the invention, e.g., with a "NILE" module 206. The application 200 posts a listener using connection layer 202 APIs on a specific port. Conventionally, a server side application 100 normally posts a listener; this identifies the port where a particular service listens for incoming connections. For instance, HTTP listens on port 80, while HTTPS (HTTP with SSL) listens on port 443. These port assignments are standardized, and are registered with the Internet Assigned Number Authority for the different protocols.

As data arrives on the port, it is handed over to the appropriate protocol handler via registered functions. This SSL/TLS protocol data flow and architecture are illustrated in FIG. 6; the steps shown are discussed below.

Step 1. After establishing a connection, the lower connection layer 502 receives a packet destined for a posted port.

Step 2. The connection layer 502 invokes a method such as lowerSSLReceive( ), handing the incoming data to the SSL/TLS (NILE) protocol layer 206.

Step 3. The SSL/TLS (NILE) protocol layer 206 checks whether packet content type is a valid handshake type or an application data type.

Step 4. The packet is identified as being of handshake type. The SSL/TLS (NILE) Protocol layer 206 processes the packet and proceeds with the handshake by invoking a method such as lowerConnLayerSend( ) to send handshake data back to the network peer. The application 200 (see FIG. 5) is not involved in this exchange; only the lower half 502 of the connection layer 202 and the SSL/TLS protocol code 206 are involved.

Steps 1 through 4 are repeated until the full handshake is completed with a session established between the peers, or an error occurs and either party aborts the handshake. Keep in mind that the SSL/TLS (NILE) protocol layer 206 will automatically decrypt the received encrypted handshake data and encrypt the handshake data to be sent, if necessary.

Figure 6:
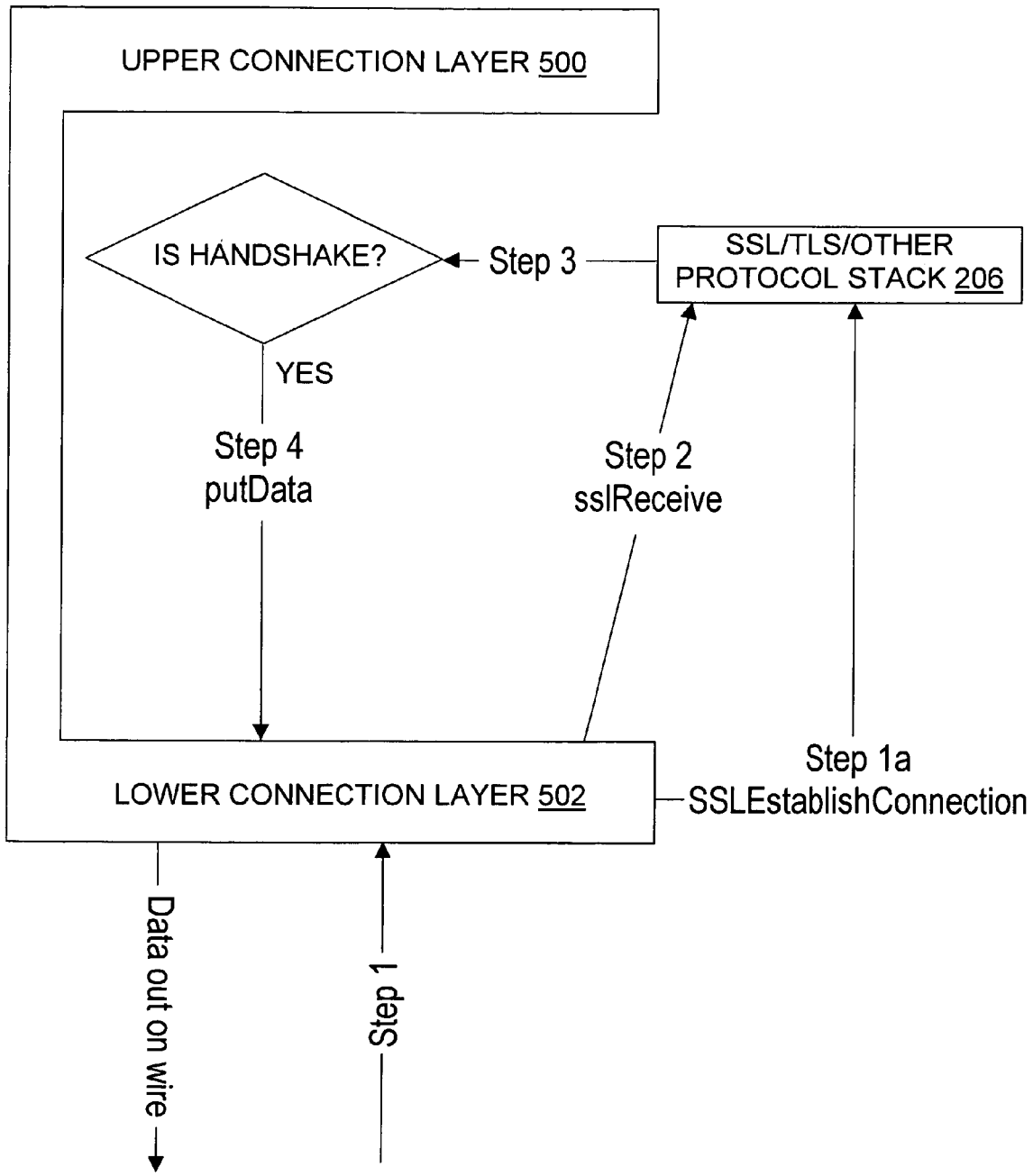
FIG. 6 is a data flow diagram further illustrating the present invention, in which a transport provider lower connection layer and an SSL stack establish an SSL connection using handshake data.
Figure 7:
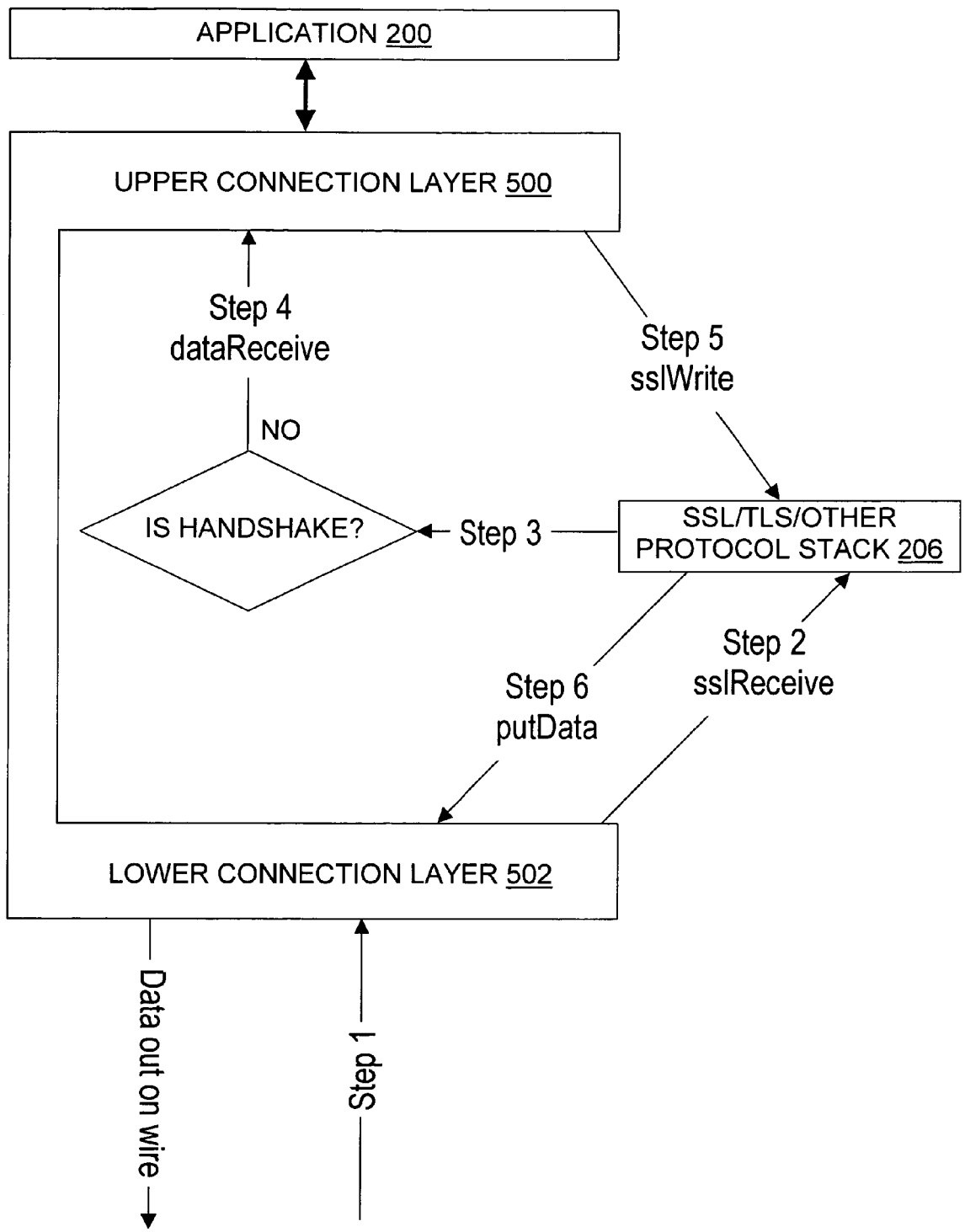
FIG. 7 is a data flow diagram further illustrating the present invention, in which an application, a transport provider upper connection layer, and an SSL stack send and receive application data over an SSL connection.
Figure 8:
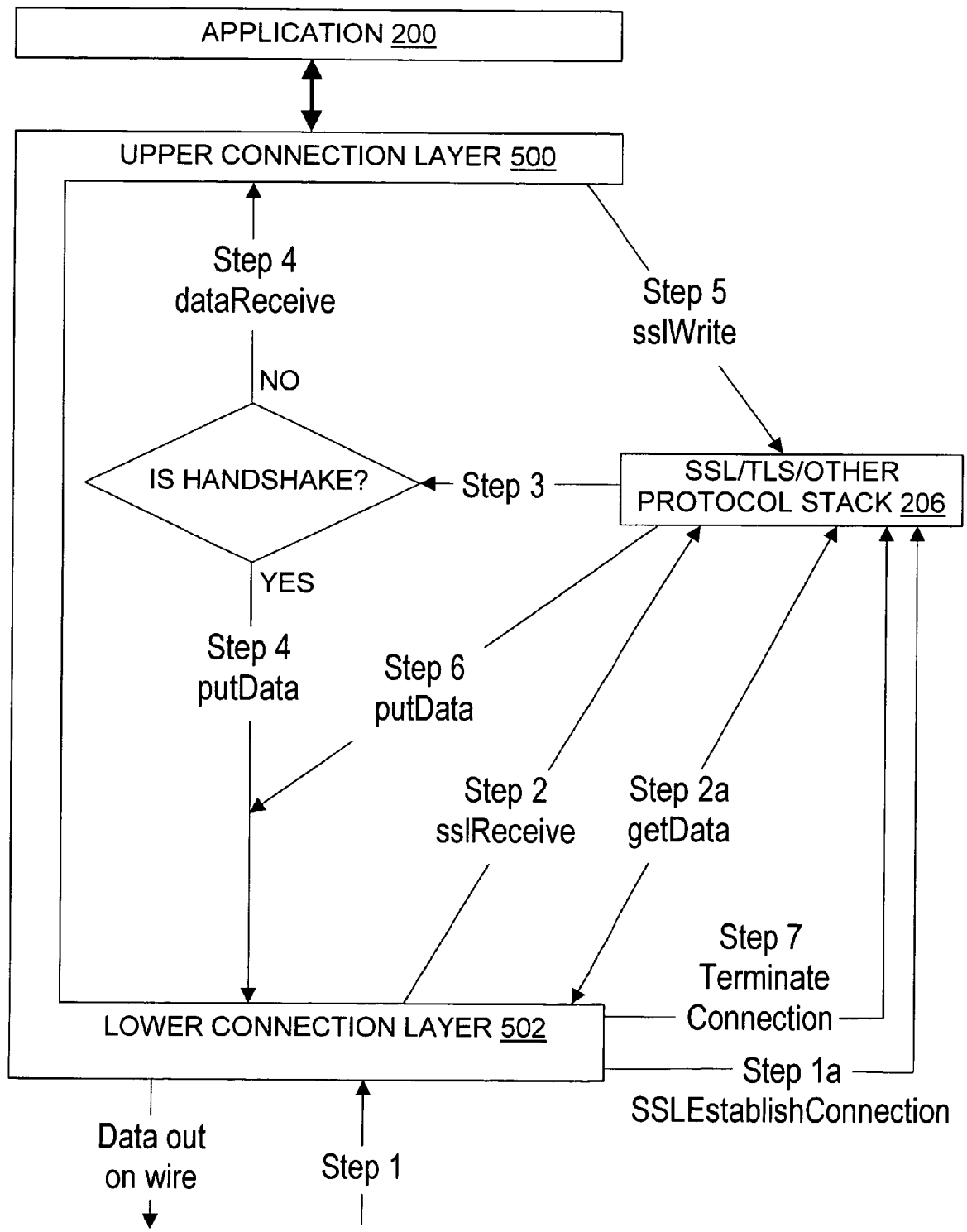
FIG. 8 is a data flow diagram combining the system components and the method steps of FIGS. 6 and 7, and further noting a connection termination step.

For clarity of illustration the diamond-shaped "IS HANDSHAKE?" test to distinguish between application data and handshake data is shown in FIGS. 6 through 8 outside the box labeled "SSL/TLS/OTHER PROTOCOL STACK 206", but it will be appreciated that both pieces of code can reside in the same program module (file, function, procedure, interrupt handler, package, library, etc.).

Application Data Transfer

Application 200 data flow and the inventive architecture are illustrated in FIG. 7.

P Step 1. The lower connection layer 502 receives a packet destined for the posted port.

Step 2. Connection layer 502 invokes a method such as lowerSSLReceive( ), handing incoming data to the SSL/TLS (NILE) protocol layer 206.

Step 3. The SSL/TLS (NILE) protocol layer 206 checks a bitfield, flag, or the like, to determine whether the packet content type is a valid handshake type or an application data type.

Step 4. In this case, the packet is of application data type. The SSL/TLS (NILE) protocol layer 206 processes the packet, which in this case means that the received encrypted data is decrypted, and then proceeds to invoke a connection layer 202 method such as upperConnLayerDataReceive( ). The upper connection layer 500 is then responsible to hand the decrypted application data to the corresponding application 200, in the format expected by the application 200. The application 200 was not involved in the decryption and from the application's point of view with respect to management of security procedures, the application 200 only gets clear text data from its peer. Of course, the application 200 developer may target an environment which is made secure by reason of the present invention or otherwise, and may craft the application 200 code accordingly.

Step 5. Applications 200 write to the upper connection layer 500 using their connection layer specific APIs (e.g., standard WinSock calls, when the connection layer is WinSock). The upper connection layer 500 invokes upperSSLDataSend( ) or the like.

Step 6. The SSL/TSL (NILE) protocol layer 206 encrypts the data based on the negotiated cipher suite for this SSL/TLS session, and invokes a connection layer method such as lowerConnLayerSend( ).

All SSL/TLS protocol specific data manipulations are completely separate from transport functions. The invention's module 206 creates the whole packet and then hands it to the lower connection layer 502 to use whatever transport mechanism it sees fit.

Handshake and Data Flow

FIG. 8 combines FIGS. 6 and 7 to show the complete data flow.

Step 7. Since the inventive module 206 is totally independent of all transport message details, it is the responsibility of the connection layer 202 to invoke an inventive method such as sslTerminateConnection( ) to "clean up" all resources associated with a given SSL connection, on a particular socket, e.g., release any allocated memory, release any write locks, update any internal status flags, and otherwise terminate the socket cleanly to avoid errors or unnecessary loss of resource access. The word "socket" is used here as a generic term to identify a transport end point.

Structures and APIs

APIs and structures for one implementation of the invention are shown below. Of course, other implementations may use somewhat different APIs and/or structures.

Structures, Variables

```
typedef struct
{
    unicode *wallet;              //name of wallet, e.g. KMO, file
    int walletLen;
    time_t sidTimeOut;            //session ID time to live
    long sidEntries;              //number of session IDs to store
    char *sidDir;                 //session ID dir
    unicode *walletProvider;      //wallet content provider
    unicode **keysList;           //alias for prvt key in wallet
    int numElementsInKeyList;     //number of elements in array
    unicode **TrustedRootList;    //array of trusted root names
    int numElementsInTRList;      //number of elements in array
    void *reservedforfutureuse;   //reserved to set ciphers
    void *reservedforfutureCRL;   //reserved for CRL
    int reservedforfutureCRLLen;  //reserved for CRL len.
    void *reserved1;
    void *reserved2;
    void *reserved3;
} sslOpts;
struct SSL_FunctionTable
{
unsigned short                    version;
union
    {
    struct
        {
            unsigned short ReadKeyFrom : 2;
        };
    unsigned short                flags;
    };
UpperConnLayerDataReceiveFunc     * upperConnLayerDataReceive;
LowerConnLayerSendFunc            * lowerConnLayerSend;
LowerConnLayerGetHostInfoFunc     * lowerConnLayerGetHostInfo;
SSLConnectionHasAbortedFunc       * sslConnectionHasAborted;
UpperSSLDataSendFunc              * upperSSLDataSend;
LowerSSLReceiveFunc               * lowerSSLReceive;
SSLEstablishConnectionFunc        * sslEstablishConnection;
SSLTerminateConnectionFunc        * sslTerminateConnection;
ConnLayerSSLNotifyAndAuthFunc     * connLayerSSLNotifyAndAuth;
SSLEstablishConnectionCallbackFunc *
    sslEstablishConnectionCallback;
UpperSSLDataSendListFunc          * upperSSLDataSendList;
SSLGetCipherFunc                  * sslGetCipher;
sslOpts sslOptions;
} sslFuncTable;
```

Register Function

A connection layer calls this function when a particular application wants to convert plain sockets into secure sockets. This function is exported by the NILE module 206.

Parameter keyID is the fully distinguished name of the key for SSL to read and use for that application. This parameter is NULL if "ReadKeyFrom" in the funcTable is set to "GetKey-FromStruct". In the case of reading from the sslOpts struct an application has the choice of specifying a provider and location for getting the keys and trusted roots that are to be used. An application has the choice of specifying keys tied to a specific provider, or in the case of client, only specifying trusted roots.

Parameter funcTable is a function table to exchange connection-specific APIs with NILE software 206 and for NILE to provide SSL-specific call back functions.

Parameter regID is an ID to identify a particular application 200 and all its cryptographic properties.

int SSLRegister(
  char *keyID,
  sslFuncTable *funcTable,
  int *regID

DeRegister Function

A connection layer 202 calls DeRegister( ) when an application 200 does not want to use the secure sockets module 206 any more. This function is exported by the NILE module 206.

Parameter regID is the ID to identify a particular application 200 and all its cryptographic properties.

int SSLDeRegister(int regID)

Establish Connection

The lower connection layer 502 calls this function to establish an sslHandle. This is a private function implemented in the NILE layer provided to the connection layer via the sslFuncTable.

Parameter funcTable is a function table to exchange connection-specific APIs with NILE code 206 and for NILE to provide SSL-specific call back functions.

Parameter regID is the ID to identify a particular application 200 and all its cryptographic properties.

Parameter handshakeMode specifies the type of handshake; possibilities include server mode, client mode, and server with client authentication enabled mode. These modes may be combined with an interactive mode or a blind-root-accept mode. In interactive mode, if a party to the proposed secure connection does not recognize another party's asserted trusted root, then the software 206 prompts the human user for instructions on whether to accept the root nonetheless. In blind-root-accept mode, unrecognized trusted roots are accepted, without any user prompt.

Parameter connHandle is a connection layer 202 identification for each incoming or outgoing connection.

As to parameter sslHandle, NILE software 206 binds the opaque data structure connHandle and the cryptographic context to this sslHandle, including other SSLstate information. This is returned as a void * to the connection layer. All future operations for this SSL connection need to pass in this sslHandle.

int SSLEstablishConnectionFunc(
  struct SSL_FunctionTable *funcTable,
  int regID,
  int handshakeMode,
  void *connHandle,
  struct SSLHandle **sslHandle Handshake Completed In one embodiment, NILE software 206 calls this function when the client SSL/TLS handshake has completed successfully. If the handshake fails, a function such as SSLConnectionHasAborted( ) is called instead. This is a private function implemented in a connection layer 202 and provided to the NILE layer 206 via the sslFuncTable.

Parameter connHandle is a connection-layer-specific structure to identify a specific connection and its associated properties. This should have a pointer back to the opaque data structure sslHandle associated with that connection.

void ConnLayerEstablishConnectionCallbackFunc(void* connHandle)

Terminate Function

The connection layer 202 calls this function to inform NILE that the connection is being terminated. This call terminates the SSL session and frees memory associated with an SSL handle and cryptographic contexts. This is a private function implemented in the NILE layer 206 and provided to the connection layer 202 via the sslFuncTable.

Parameter sslHandle is a handle to a structure maintaining all relevant data to a particular SSL connection. The connection layer 202 treats this as a void *, but SSL knows what to clear in a given handle for termination.

int SSLTerminateConnectionFunc(struct SSLHandle *sslHandle)

SSL Receive Function

The connection layer 202 calls this function any time it receives data on an SSL port. Since the connection layer 202 has no knowledge of SSL or other transport layer security protocols, the lower connection layer 502 calls this API function to hand incoming packets to NILE code 206. In the case of a security handshake 208, this function routes the incoming packets to the appropriate handler inside NILE 206, whereas, in the case of application data 204, this function calls a decryption routine. This is a private function implemented in the NILE layer 206 and provided to the connection layer 202 via the sslFuncTable.

Parameter sslHandle points to an sslHandle associated with a particular connection.

Parameter in Segment is a BufSegment containing the data received from the connection layer 202.

int LowerSSLReceiveFunc(
  struct SSLHandle *sslHandle,
  BufSegment *insegment )

SSL Send Function

The UpperSSLDataSend( ) and UpperSSLDataSendList( ) functions encrypt the application data 204 and call the lower connection layer 502 to send the encrypted data. The upper connection layer 500 calls these API functions whenever the application 200 needs to encrypt data and send it to a peer. These are private functions implemented in the NILE layer 206 and provided to the connection layer 202 via the sslFuncTable. The difference between UpperSSLDataSend( ) and UpperSSLDataSendList( ) is that the second function sends multiple BufSegments through the SSL layer at once. SSLDataSendList takes all (or some, on error) of the BufSegments off the list, encrypts the data and calls the connection layer to send it. UpperSSLDataSendList( ) accepts ANY length of BufSegments, does NOT guarantee that segment boundaries will be preserved, MAY choose to leave some segments on the list, ALWAYS consumes a BufSegment IF removed from the list, does NOT delete the list itself, does NOT block.

Parameter sslHandle points to an sslhandle associated with a particular connection.

Parameter outSegment is a BufSegment. All data received by the upper connection layer 500 from the application 200 is sent to NILE code 206 in a BufSegment to be encrypted. The upper connection layer 500 allocates a BufSegment for clear text data and NILE code 206 frees it inside this call, after it has encrypted and copied the cipher text data to a new BufSegment. NILE code 206 will not free the BufSegmentList, but will free BufSegments that the NILE code 206 will take off the list and consume.

int UpperSSLDataSendFunc(
    struct SSLHandle *sslHandle,
    BufSegment *outsegment )

int UpperSSLDataSendListFunc(
    struct SSLHandle *sslHandle,
    BufSegmentList *outSegmentList)

Connection Receive and Send Functions

The following functions are implemented in the respective connection layers 202, e.g. WinSock and the Novell proxy connection layer. SSL/TLS send and receive functions call these functions. The passed-in BufSegments need to be freed by these functions after giving decrypted data to the application 200 or writing encrypted data to the wire.

An upper NILE 206 layer calls the function UpperConnLayerDataReceiveFunc( ) after decrypting the data it has received from the lower connection layer 502 to hand clear text data to the upper connection layer 500.

Parameter connhandle points to the current connection structure.

Parameter segment contains data that has been decrypted by the NILE layer 206.

int UpperConnLayerDataReceiveFunc(
    void *connHandle,
    BufSegment *segment A lower NILE 206 layer calls the function LowerConnLayerSendFunc( ) to send packets to the peer through the lower connection layer 502. This function will encrypt the data as necessary.

Parameter connhandle points to the current connection structure.

Parameter segment contains data that has been decrypted by the NILE layer 206.

Parameter sendFlags specifies whether this call should queue the data or send it immediately. This flag is optional, depending on the connection layer 202.

int LowerConnLayerSendFunc(
    void *connHandle,

BufSegment *segment, int sendFlags

The NILE layer 206 calls the function LowerConnLayerGetHostInfoFunc( ) to obtain information about the remote peer.

Parameter connHandle points to the current connection structure.

Parameter host is the name of the remote peer.
    Parameter hostlen points to the length of host.
    Parameter port identifies the remote peer port.

int LowerConnLayerGetHostInfoFunc(
    void *connHandle,
    unsigned char **host,
    unsigned int *hostlen,
    unsigned int *port )

The NILE layer 206 calls the function SSLConnectionHasAbortedFunc( ) to inform the connection layer 202 that the sslHandle is now invalid. The associated connection should be closed when convenient.

Parameter connHandle points to the current connection structure.

int SSLConnectionHasAbortedFunc(void *connHandle)

The NILE layer 206 calls the function ConnLayerSSLNotifyAndAuthFunc( ) if the connection layer 202 has asked to be informed of handshake proceedings.

Parameter connHandle points to the current connection structure.

Parameter certificatechain is the chain of the certificates presented by the peer during an SSL/TLS handshake.

Parameter subjectDN is the subject name from the leaf certificate sent by the peer.

Parameter cipher is the current cipher suite negotiated for the current connection.

Parameter sessionID is the SSL session ID for the current connection.

Parameter flags specifies which of the above information is asked for in this call.

int ConnLayerSSLNotifyAndAuthFunc(
    void *connHandle,
    BYTE *certificatechain,
    char *subjectDN,
    unsigned char *cipher,
    unsigned char * sessionID,
    int flags )

These are private functions that are handed to NILE code 206 by the individual connection layers 202 during registration via the sslFuncTable, bearing the same signature but different functionality, as best suited to their respective connection models.

Control Functions

The following function(s) are implemented in the NILE 206 layer. The respective connection layers 202, e.g. WinSock and the Novell proxy connection layer might surface an IOCTL or an API to their respective application 200 layers, which when called by the application 200 layer will trigger the connection layers 202 to call SSLGetCipher( ) in the NILE 206 layer. This function will return the ciphers associated with the given regID. This is a private function implemented in the NILE layer 206 and provided to the connection layer 202 via the sslFuncTable.

int SSLGetCipherFunc(
    int regID,
    char *spec[3],
    int *len )

BufSegment

One implementation of the BufSegment and BufSegmentList structure is provided below.

```
class BufSegment
{
    friend class BufSegmentList;
    friend class BufManager;
// these enums are used as discriminators in the
//BufSegment constructors
    enum SplitHead { doSplitHead };
    enum SplitTail { doSplitTail };
    enum Clone { doClone };
    // Public data members
public:
    // Custom public work area., for specialized BufSegment use
    union
    {
        char    workChars[16];
        LONG    workLongs[4];
        void*   workPointers[4];
    };
```

-continued

```
    // Function members
public:
    // newBufSegment allocates a buffer and
    // automatically creates the associated
    // BufManager.
    static BufSegment * newBufSegment (size_t len);
    BufSegment(BufManager&);
    // initializes to initial segment of BufManager
    BufSegment(BufManager& mgr, char* dataPtr, size_t len);
    BufSegment(BufSegment& orig, size_t splitPt, SplitHead);
    BufSegment(BufSegment& orig, size_t splitPt, SplitTail);
    BufSegment(BufSegment& orig, Clone);
    ~BufSegment( ); // no derived classes
    // return the address of the data (possibly after realization)
    // how long the pointer remains valid depends . . .
    char*    data( );
    size_t   length( );    // length of data block
    BufSegment* next( );   // next on a BufSegmentList
    BufManager* getManager( );
    // Splits the segment at the specified point,
    // returns a new segment that
    // represents the first part or head of the previous buffer.
    // The existing segment now represents the second part or tail
    // of the previous buffer
    BufSegment*   splitHead(size_t splitPt);
    // Splits the segment at the specified point.
    // Returns a new segment that
    // represents the second part or tail of the previous buffer.
    // The existing segment now represents the first part or head
    // of the previous buffer
    BufSegment*   splitTail(size_t splitPt);
    void discardTail(size_t splitPt);
    void discardHead(size_t splitPt);
    BufSegment* concat(BufSegment *tailSegment);
    // copy data out
    size_t read( char *target, size_t len );
    size_t read(off_t offSeg, char *target, size_t len);
    // copy data in
    size_t write(char *source size_t len );
    size_t write(off_t offSeg, char *source, size_t len);
#if DEBUG_VERSION
        FASTCALL LONG debugDump (struct ScreenStruct * screen,
LONG repeat, BOOL boolDumpDataAsWell);
        FASTCALL LONG debugwalkAndDump (struct ScreenStruct *
screen, LONG repeat, BOOL boolUseNext);
        #endif
private:
        BufSegment(size_t);         // defaults to CoreBufManager
        // clone returns a reference to the same space
        // for reading only!
        BufSegment*   clone( );
        BufSegment(const BufSegment&);              // no copying
        BufSegment&   operator=(const BufSegment&); // no assignment
        void addToDebugList ( );
        void removeFromDebugList ( );
// Data members
private:
        BufManager&   mgr;    // owns the buffer of which this is
a segment
        char*         dataPtr;    // the data
        size_t        len;        // length of this segment
        BufSegment*   pNext;      // used by BufSegmentList
        #if DEBUG_VERSION
        static BufSegment*   debugListHead;
        BufSegment*          debugPrev;
        BufSegment*          debugNext;
        LONG                 signature;
        #endif
};
class BufSegmentList
// Function members
public:
    BufSegmentList( );
    ~BufSegmentList( );
    void queue(BufSegment* segment);
    BufSegment* dequeue( );
    void unDequeue(BufSegment* segment);
    bool isEmpty( );
    LONG nextSegmentSize( );
    BufSegment* next(BufSegment* segment);
    BufSegment* getHead( ) { return head; }
    BufSegment* getTail( ) { return tail; }
    BufSegment* merge (BufSegment * startSeg, int newLength);
    void deleteList ( );
    void moveList(BufSegmentList *newList);
#if DEBUG_VERSION
    LONG debugDump (struct ScreenStruct * screen, LONG repeat);
    #endif
// Data members
private:
    BufSegment* head;
    BufSegment* tail; // Undefined when head is NULL
};
```

CONCLUSION

An architecture for secure network communications includes at least the security layer 206 which is sandwiched between the upper connection layer 500 and the lower connection layer 502. LDAP and other application programs 200 need not deal directly with the details of security handshakes, encryption, and decryption. Instead, the application 200 sends plain text data to the upper connection layer 500, which passes it to the security layer 206. The security layer 206 manages the necessary security handshakes, and encrypts the data, for SSL, TLS, or other security protocols. The security layer 206 then passes the encrypted application data to the lower connection layer 502, which transports it using WinSock, Novell BorderManager, TCP or another transport protocol. The security layer 206 need not manage the transport protocol, as this is done by the connection layers 202. Encrypted data received over the network at the lower connection layer 502 is passed to the security layer 206 for decryption, and then to the upper connection layer 500 for transport to the application 200. This approach to secure network communications relieves applications 200 of direct responsibility for managing security procedures such as handshakes and encryption/decryption, while still making industry-standard tools such as SSL available for use by the applications 200.

Although particular embodiments (methods, systems, and configured media) of the present invention are expressly illustrated and described herein, it will be appreciated that other embodiments may be formed according to the present invention. Also, unless otherwise expressly indicted, the description herein of an embodiment of the present invention in one category (e.g., a method) extends to corresponding embodiments in the other categories (e.g., a system).

As used herein, terms such as "a" and "the" and item designations such as "application" are generally inclusive of one or more of the indicated item. In particular, in the claims a reference to an item generally means at least one such item is required.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method of providing transport-independent secure communications in a computer network, comprising the steps of:
   directly receiving application data, from an application, at an upper connection layer of a transport protocol stack, wherein the application data is received from the application using a connection specific application programming interface (API) desired for communication by the application and which is not associated with security;
   passing the application data from the upper connection layer to a security layer from within the transport protocol stack and unbeknownst to the application;
   encrypting the application data within the security layer;
   passing the encrypted application data from the security layer to a lower connection layer of the transport protocol stack; and
   sending the encrypted application data from the lower connection layer out a network connection;
   wherein the application is not required to perform security handshakes in order to send encrypted application data over the network, the connection layers support at least one network transport protocol, and the security layer is not specific to that transport protocol.

2. The method of claim 1, further comprising the steps of receiving at the lower connection layer encrypted application data which came in at the network connection; passing the encrypted application data from the lower connection layer to the security layer; decrypting the application data within the security layer; passing the decrypted application data from the security layer to the upper connection layer; and sending the decrypted application data from the upper connection layer to the application, without requiring that the application perform a security handshake.

3. The method of claim 1, further comprising the step of the lower connection layer establishing a connection with a handshake mode that is at least one of an interactive mode and a blind-root-accept mode.

4. The method of claim 1, further comprising the step of the lower connection layer establishing a connection with a handshake mode that is at least one of a server mode, a client mode, and a server with client authentication enabled mode.

5. The method of claim 1, further comprising the step of changing a list of trusted roots for the secure connection.

6. The method of claim 1, further comprising the step of the security layer informing at least one of the connection layers of security handshake proceedings.

7. A system for secure computer networking, comprising:
   an application which is free of code for performing security procedure handshakes for secure network communications;
   at least one connection layer directly interfaced with the application, the connection layer comprising an upper connection layer associated with a transport protocol stack and a lower connection layer associated with the transport protocol stack, the connection layers comprising code for performing at least one network transport protocol; and
   a security layer callable from the connection layer rather than the application and wherein the security layer is unbeknownst to the application, the security layer comprising code for performing security procedure handshakes for secure network communications, the security layer also comprising code for encrypting and decrypting application data, and wherein the application initially sends application data to the protocol stack of the upper connection layer directly using a desired application programming interface (API) associated with a connection mechanism that is not associated with security.

8. The system of claim 7, wherein the connection layers comprise code for performing a WinSock network transport protocol.

9. The system of claim 7, wherein the security layer comprises code for performing security procedure handshakes for a Secure Sockets Layer session.

10. The system of claim 7, wherein the security layer comprises code for performing security procedure handshakes for a Transport Layer Security session.

11. The system of claim 7, wherein the application comprises code for providing Lightweight Directory Access Protocol services.

12. The system of claim 7, comprising a means for the security layer and at least one of the connection layers to identify a particular application and its cryptographic properties.

13. The system of claim 7, comprising a means for the security layer and at least one of the connection layers to identify a function as a call back function.

14. The system of claim 7, comprising a means for establishing a secure connection using a specified handshake mode.

15. The system of claim 7, further comprising a legacy application which performs security handshakes, and a security module supporting a secure connection to the legacy application.

16. A configured storage medium embodying data and instructions readable by a computer to perform a method of processing application data for secure network communications, the method comprising the computer-implemented steps of:
   at a security layer, receiving a request from a lower connection layer of a transport protocol stack to establish a secure connection, wherein an application that utilizes the security layer is unaware of the security layer and its operations;
   in response, utilizing a means for establishing a connection to establish the requested connection; and
   at the security layer, receiving encrypted application data from the lower connection layer, decrypting the application data, and passing the decrypted application data to an upper connection layer of the transport protocol stack;
   whereby the application directly receives the decrypted application data without being required to perform security procedure handshakes for secure network communications and without being aware of security communications that occur via the security layer, and wherein the application receives the decrypted application data in a desired application programming interface (API) associated with a connection that the application originally used and that is not associated with security.

17. The configured storage medium of claim 16, wherein the means for establishing a connection establishes a Secure Sockets Layer connection.

18. The configured storage medium of claim 16, wherein the method further comprises receiving the encrypted application data at the lower connection layer using a transport model.

19. The configured storage medium of claim 18, wherein the lower connection layer uses a proxy transport model.

20. The configured storage medium of claim 16, further comprising a signal embodied in the computer, the signal comprising a secure network communications protocol stack interface which is callable from at least the lower connection layer.

* * * * *